United States Patent [19]
Faulk et al.

[11] Patent Number: 5,789,904
[45] Date of Patent: Aug. 4, 1998

[54] COMPUTER BATTERY PACK CHARGE CURRENT SENSOR WITH GAIN CONTROL

[75] Inventors: Richard A. Faulk, Cypress; John C. Schluter, Conroe, both of Tex.

[73] Assignee: Compaq Computer Corporation, Houston, Tex.

[21] Appl. No.: 903,888

[22] Filed: Jul. 31, 1997

Related U.S. Application Data

[63] Continuation of Ser. No. 605,724, Feb. 22, 1996, Pat. No. 5,659,238.

[51] Int. Cl.$^6$ .................. H02J 7/12; H02H 3/00; G05B 24/02

[52] U.S. Cl. .................. 320/162; 361/93; 323/354; 320/125

[58] Field of Search .................. 320/162, 125, 320/163; 361/93, 100, 101; 323/354, 297, 281, 284

[56] References Cited

U.S. PATENT DOCUMENTS 3,602,794  8/1971  Westhaver ............... 320/139

*Primary Examiner*—Peter S. Wong
*Assistant Examiner*—Gregory J. Toatley, Jr.
*Attorney, Agent, or Firm*—Pravel, Hewitt, Kimball & Krieger

[57] ABSTRACT

A current switch is provided which selects and monitors charge and discharge states of a battery pack of a computer system. The current switch provides a current sense signal which is an indication of the current in the battery pack in order that a charge control circuit can monitor the charge state of the battery pack. The gain of the current sense signal is adjusted, depending on whether the battery pack is in a fast charging, trickle charging, or discharging state when the computer system is in a standby mode. Thus, the current switch provides a sufficient current sense signal for accurate current measurements while dissipating little power for the various battery pack charge states.

23 Claims, 2 Drawing Sheets

COMPUTER BATTERY PACK CHARGE CURRENT SENSOR WITH GAIN CONTROL

This application is a continuation of U.S. application Ser. No. 08/605,724 filed Feb. 22, 1996, U.S. Pat. No. 5,659,238.

BACKGROUND OF THE INVENTION

1. Field of the Invention

The present invention relates to a battery pack for providing power to a computer system, and more particularly to a current sensor having a selectable gain to monitor charge and discharge states of the battery pack.

2. Description of the Related Art

Computers have often been needed in locations where conventional alternating current was not available, and rechargeable batteries have been typically used as an alternative source of power, such as nickel-based batteries and lithium ion batteries, which were capable of providing power to a portable or pen-based computer system for several hours. Several rechargeable batteries were typically grouped together to form a battery of a battery pack.

Although the battery pack may have been charged in an external charger, a power supply of the host computer system typically recharged the battery pack when alternating current was available. Since rechargeable batteries have a limited cycle life, it was desirable to maximize the life of and to obtain the maximum power from each battery during every discharge cycle.

The primary design challenge confronting the earlier nickel-based battery chargers arose from the difficulty in determining the charge level of a nickel-based battery since the terminal voltage of the nickel-based battery is substantially the same regardless of the charge level. This problem was addressed by placing the microcontroller and a memory inside the battery pack as disclosed in U.S. Pat. No. 5,315,228, issued May 24, 1994, and entitled "Battery Charge Monitor and Fuel Gauge." In this battery pack, the microcontroller recalculated the total capacity of the battery pack over time, provided a fuel gauge to continually measure the remaining charge level at any given time and measured the battery pack self-discharge during periods of non-use.

A further modification of this arrangement is disclosed in commonly owned U.S. patent application Ser. No. 08/033,821, "Battery Pack Including Static Memory and a Timer for Charge Management," filed Mar. 3, 1993. In this system, the microcontroller which monitors the battery pack was moved to the host computer system. This reduced the size and cost of the battery pack; increased the battery pack shelf-life; and provided a for calculating a self-discharge rate for the battery pack.

The current in the battery of the battery pack was monitored by the microcontroller in order to control charging of the battery, monitor the discharge rate of the battery, maintain fuel gauge data and provide supervisory functions. This current was monitored for several different charge and discharge states of the battery. For example, in order to charge the battery, the battery was first fast charged, resulting in a substantial current, and thereafter the battery was trickle charged resulting in a much smaller current. Thus, when charged, the current level in the battery was a function of the charge state.

The discharge current levels in the battery also varied according to the mode of the host computer system. If the host computer system was in a standby mode, the host computer system required little power and only a small discharge current existed in the battery. However, a much larger current existed when the computer system was fully powered up.

In order to monitor the current in the battery, the prior art typically included placing a current sensor in series with the battery in order to monitor the current for all battery states. Given the variation in current level in accordance with the above-described battery states, the prior art current sensors have not provided accurate current measurements with little power dissipation for all battery states.

A low resistance, current sensing resistor has typically been used as the current sensor which dissipated little power for large battery currents. In order to measure the low voltages across this small current sensing resistor for low battery currents, though, expensive measurement circuitry has been needed to obtain accurate current measurement. Typically, costly operational amplifier circuitry with low offset voltages were used; however, the accuracy of the current measurement was still limited by the existing state of technology.

If a larger resistance was chosen for the current sensing resistor, such a resistor would produce more accurate measurements with less expensive measurement circuitry. However, this larger resistor would dissipate excessive power for large currents, such as those currents usually present during fast charge of the battery.

SUMMARY OF THE PRESENT INVENTION

Briefly, the following invention relates to a current switch placed in series with a battery of a battery pack. The current switch controls the charge and discharge states of the battery as well as provides a current sense signal which is an indication of the current in the battery. The current switch has a selectable gain for the current sense signal which is adjusted according to the level of current in the battery. The current in the battery may either be a fast charge current, a main discharge current, a trickle charge current or a standby discharge current.

A first resistor is used to provide the current sense signal for fast charge and main discharge currents, and a second resistor is used to provide the current sense signal for trickle charge and standby discharge currents. Thus, the current gain switch of the present invention matches the resistance providing the current sense signal with the magnitude of current in the battery.

The current paths of the current switch which control the charge and discharge states of the battery are switched by a first switch and a second switch which control the current flowing through the battery. The first switch is coupled between the battery and the first resistor in order to provide a low resistance current path for large currents. A second switch coupled to the first resistor provides the current sense signal for low currents. A second and a third resistor are switched into the current path of the battery for trickle charge and standby discharge currents.

The first resistor has a lower resistance than the second resistor; therefore, the first resistor provides a sufficiently large current sense signal for large currents; however, when smaller currents exist in the battery, the second resistor is switched into the current path of the battery which provides a sufficiently large current sense signal for the smaller currents.

Thus, the resistance in series with the battery that provides the current sense signal is matched to the magnitude of current in the battery in order to minimize power dissipation and provide accurate current measurements for more economic measurement circuitry for all battery states.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
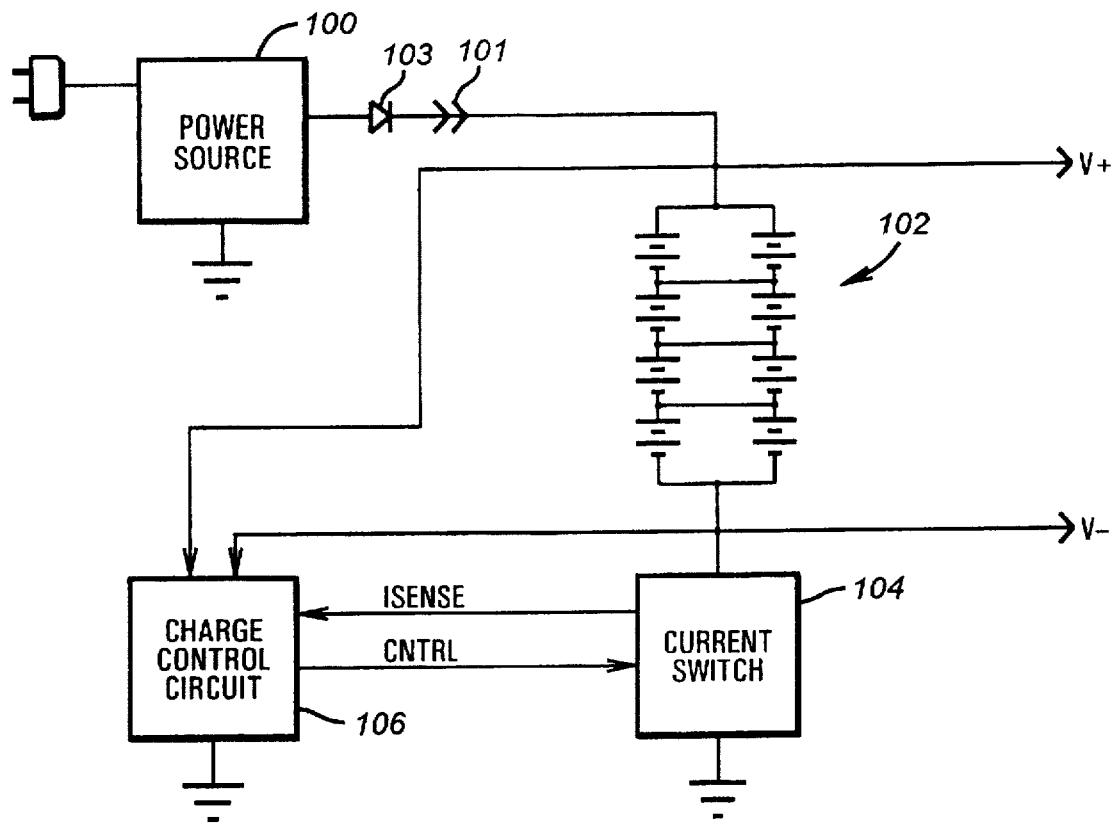
FIG. 1 is a block diagram illustrating a host computer and battery pack incorporating the present invention.

As shown in FIG. 1, a power source 100 coupled to a battery 102 charges battery 102 when battery 102 needs charging. Power source 100 resides in or is part of a host computer system, and battery 102 resides in a removable battery pack which provides and receives power from and to the host computer system. Power source 100 could be an AC adapter internal or external to the host computer system, or power source 100 could be any other conventional alternate source of power for charging the battery 102.

In the described embodiment, power source 100 is an external AC adapter coupled to the host computer system through an external connector 101. A diode 103 has its anode connected to the power source 100 and its cathode connected to the connector 101. Thus, when power source 100 is connected to the host computer system and enabled, power source 100 only charges battery 102, as any discharging is prevent by diode 103. Power source 100 can be either power or current limited. A charge control circuit 106 controls the charge and discharge states of battery 102.

Battery 102, in the described embodiment, includes four series cells where each cell has two parallel connected rechargeable batteries. Battery 102 can be any configuration of cells including a configuration of just one cell. The positive terminal of battery 102 is connected to a V+ line, and the negative terminal of battery 102 is connected to a V- line. The V+ line is coupled to power source 100 through connector 101.

Connected in series with power source 100 and battery 102 is a current switch 104. The current switch 104 is also connected to charge control circuit 106 to provide a signal CNTRL and receive an ISENSE signal. Charge control circuit 106 controls between the various charge levels: trickle charge, fast charge, main discharge and standby discharge states, of battery 102 by furnishing the current signal, CNTRL, to activate current switch 104. Current switch 104 furnishes the signal, ISENSE, which is an indication of the current flowing in battery 102 for any of the states of battery 102, as described further below.

The ISENSE signal is a voltage level that is a product of the current in battery 102 multiplied by either a first or a second predetermined gain, depending on the state of battery 102. As further explained below, for large battery 102 currents, ISENSE is a product of the first predetermined gain and the battery 102 current. Conversely, for small battery 102 currents, ISENSE is a product of the second predetermined gain and the battery 102 current.

In order to charge battery 102, power source 100 first supplies a large current, known as a fast charge current in the industry, to battery 102. In order to charge battery 102 to its maximum charge capacity, power source 100 finishes charging battery 102 by supplying a much smaller current, known as a trickle charge current in the industry, to battery 102. Current switch 104, as activated by charge control circuit 106, controls whether power source 100 provides trickle charge or fast charge current to battery 102.

A trickle charge state is the state existing when battery 102 is being charged by a trickle charge current. A fast charge state refers to the state of battery 102 when battery 102 is being charged by a fast charge current.

A main discharge state occurs when battery 102 provides a large discharge current, referred to as a main discharge current, to the host computer system when the host computer system is not in a standby mode, i.e., the host computer system is fully powered up. The standby discharge state refers to the state of battery 102 when battery 102 provides a small discharge current, referred to as a standby discharge current, to the host computer system when the host computer system is in its standby mode.

Charge control circuit 106 monitors current in battery 102, provided as the ISENSE signal, in order to control the charging of battery 102, monitor the discharge rate of battery 102, maintain fuel gauge data for battery 102 and provide supervisory functions for battery 102. When charge control circuit 106 asserts the signal CNTRL to current switch 104, current switch 104 responds and allows a large charging current to exist in battery 102 when power source 100 is present. This places battery 102 in either a fast charge or a main discharge state.

Figure 3:
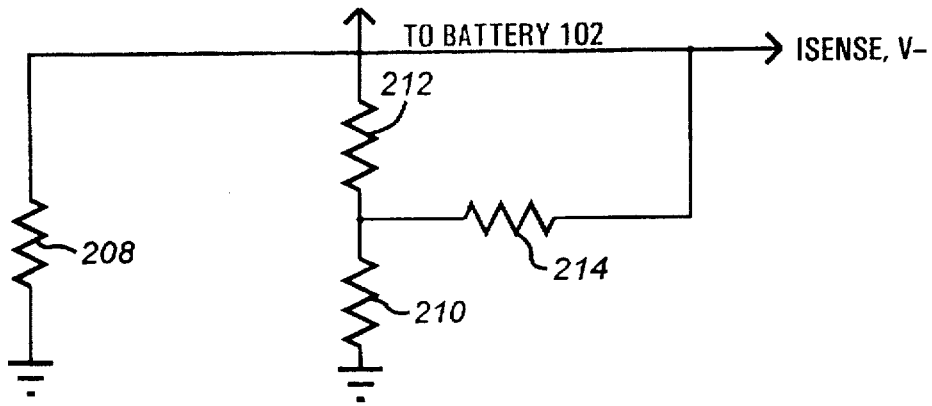
FIG. 3 is a diagram of the equivalent circuit present in the current switch of FIG. 2 during main discharge or fast charge currents of the battery.

During either of the fast charge or main discharge states of battery 102, the elements of switch 102 actually in operation form an equivalent circuit illustrated in FIG. 3. The signal ISENSE is at these times a product of the first predetermined gain and the battery 102 current.

Figure 4:
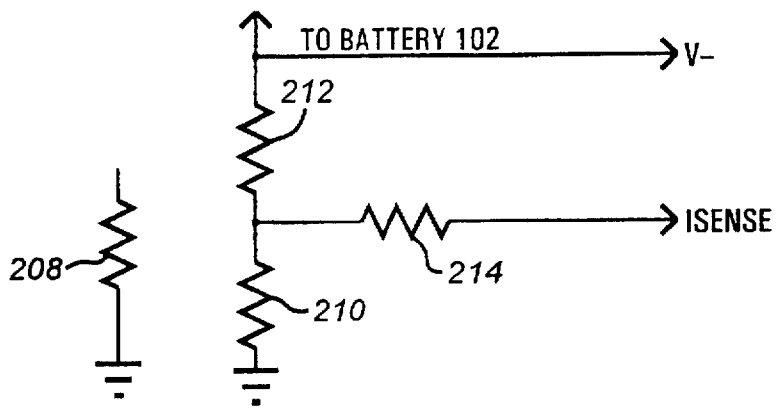
FIG. 4 is a diagram of the equivalent circuit present in the current switch of FIG. 2 during trickle charging of the battery.

When charge control circuit 106 negates the signal CNTRL, current switch 104 then alters its operating condition and provides a more resistive path for current flowing through battery 102. This equivalent resistive network formed then in switch 102 is shown in FIG. 4. This restriction of current in battery 102 places battery 102 in either a standby discharge state or a trickle charge state, depending again on whether power source 100 is present. During these states of battery 102, ISENSE is a product of the second predetermined gain and the battery 102 current.

Figure 2:
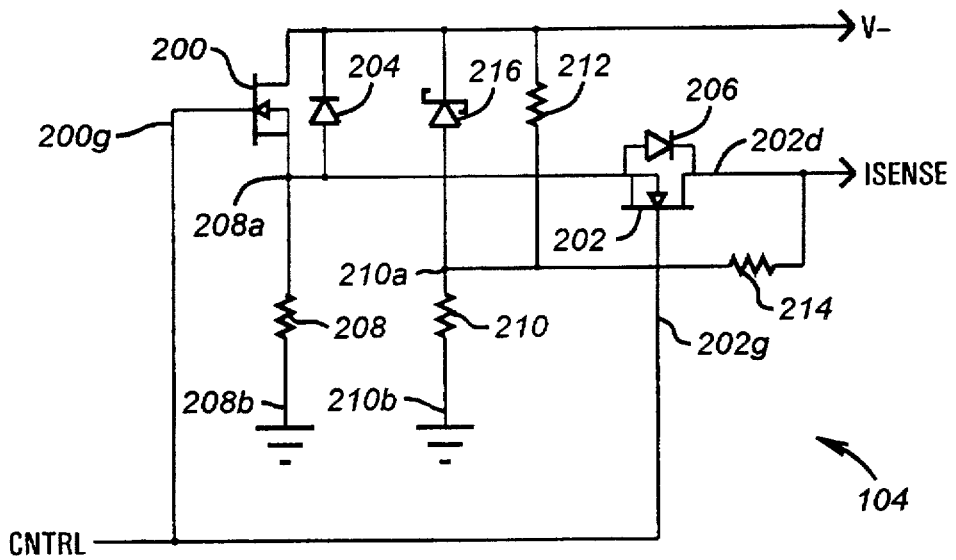
FIG. 2 is a more detailed schematic diagram of the current switch of FIG. 1.

Current switch 104 includes a current sense resistor 208 (FIG. 2) that has a terminal 208a for providing ISENSE during fast charge and main discharge states of battery 102. Resistor 208 has a very small ohmage value, on the order of 0.05 ohms for example. The value of resistance for resistor 208 establishes the first predetermined gain. This value of resistance is chosen so resistor 208 dissipates little power while the voltage across resistor 208 is sufficient to provide an ISENSE signal which is measurable by inexpensive measurement circuitry inside charge control circuit 106.

A terminal 208b of resistor 208 is connected to ground, and the terminal 208a of resistor 208 is connected to the source of an N channel, enhancement mode, metal-oxide-semiconductor field-effect-transistor (MOSFET), transistor 200.

Charge control circuit 106 provides the control signal CNTRL to a gate terminal 200g of transistor 200, and the drain of transistor 200 is connected to the V– line. Transistor 200 functions as an on-off switch, activated by CNTRL, with a built-in diode 204 having its anode connected to the terminal 208a and its cathode connected to the V– line to limit switching voltage swings of transistor 200 and to allow high current discharge prior to transistor 200 being turned on. Transistor 200 reduces losses in diode 204 when battery 102 is in a main discharge state. When power source 100 is not present and a small current is required from the battery 102, battery 102 is in a standby discharge state. During this state, diode 204 does not conduct. When the signal CNTRL is asserted, transistor 200 conducts and resistor 208 is connected in series with battery 102, as is indicated in the equivalent circuit of FIG. 3.

Shown in FIG. 3 is the equivalent circuit of current switch 104 when fast charge or main discharge currents exist in battery 102. When charge control circuit 106 asserts CNTRL, resistor 208 is effectively coupled between the V– line and ground. When this occurs, the voltage of the V– line is approximately equal to ISENSE. Resistor 208 provides a very low resistance path as compared to the path created by resistor 210 in series with the parallel resistance of resistor 212 and 214. Thus, resistor 208, having a small value of resistance, sets the effective resistance provided by current switch 104 and resistor 208 provides ISENSE during the fast charge and main discharge states of battery 102.

Terminal 208a of resistor 208 is connected to the source terminal of a transistor 202 which, like transistor 200, also functions as an on-off switch, activated by the signal CNTRL from charge control circuit 106. Transistor 202 is also preferably an N channel, enhancement type, MOSFET. A drain terminal 206d of transistor 202 provides ISENSE when charge control circuit 106 asserts CNTRL. A built-in diode 206 has its anode connected to the source terminal of transistor 202 and its cathode connected to drain terminal 206d of transistor 206d. A gate terminal 202g of transistor 202 receives the signal CNTRL from charge control circuit 106. As shown in the equivalent circuit of FIG. 3, when charge control circuit 106 asserts CNTRL, both transistors 200 and 202 conduct, and the current through battery 102 is directed through resistor 208. ISENSE provides an indication of the current in battery 102.

The value of resistance for resistor 208 is chosen to provide accurate current measurements measurable by inexpensive circuitry for fast charge or main discharge currents. This value of resistance for resistor 208 is also chosen to minimize power dissipation; however, the value of resistance chosen for resistor 208 for these purposes is too low to ensure proper measurements when a trickle charge or a standby discharge current exists in battery 102. Thus, a second resistor 210 is used to provide ISENSE for standby discharge and trickle charge currents. The value of resistance of resistor 210 establishes the second predetermined gain.

The value of resistance for resistor 210 is larger than that for resistor 208 because of the smaller currents levels present when resistor 210 is connected by current switch 104. As practiced, resistor 210 has a resistance of about 0.4 ohms. Thus, the resistance of resistor 210 is some eight times larger than the resistance of resistor 208 which establishes the second predetermined gain to be eight times that of the first predetermined gain.

A first terminal 210b of resistor 210 is connected to ground, and a second terminal 210a of resistor 210 is connected to one terminal of a resistor 212 and one terminal of a resistor 214. The other terminal of resistor 212 is connected to the V– line, and the other terminal of resistor 214 is connected to the drain terminal 206d of transistor 206.

Charge control circuit 106 changes the operating condition of current switch 104 and directs the battery 102 current through resistor 210 by negating the signal CNTRL. Transistors 200 and 202 do not conduct when CNTRL is negated. The measurement circuitry of control circuit 106 typically connected to receive ISENSE has a very high input impedance; therefore, the effective battery 102 current path when CNTRL is negated, as is shown in FIG. 4, is through resistor 212 and resistor 210. Thus, by negating CNTRL, charge control circuit 106 allows a trickle charge current to flow through battery 102 and charge control circuit 106 places battery 102 in a trickle charge state when power source 100 is present. The trickle charge current is selectable through the value of resistance chosen for resistor 212.

Shown in FIG. 4 is an equivalent circuit of current switch 104 when trickle charge current exists in battery 102. For this state, charge control circuit 106 negates CNTRL which removes resistor 208 from the current path of battery 102. As noted, the measuring circuitry of charge control circuit 106 has a very high input impedance; therefore, minimal current flows in resistor 214. Resistor 212 and resistor 210 set the effective current path. Thus, resistor 212 effectively sets the trickle charge limit, and resistor 210 provides an indication of the trickle charge current in battery 102.

The last state provided by current switch 104 is the state when standby discharge current exists in battery 102. For trickle charge currents, resistor 212 limits the current through battery 102; however, this trickle charge current limit is not needed for the standby discharge current. Instead, a Schottky diode 216 is provided in parallel with resistor 212 to bypass resistor 212. The cathode of diode 216 is connected to the V– line, and the anode of diode 216 is connected to terminal 210a of resistor 210. For standby discharge current level, diode 216 conducts and effectively bypasses resistor 212 as a current path. Resistor 212 has a resistance that is several orders of magnitude greater than the resistance of resistor 210. Thus, the effective standby discharge current path consists of only resistor 210 which, as previously noted, has a small value.

Figure 5:
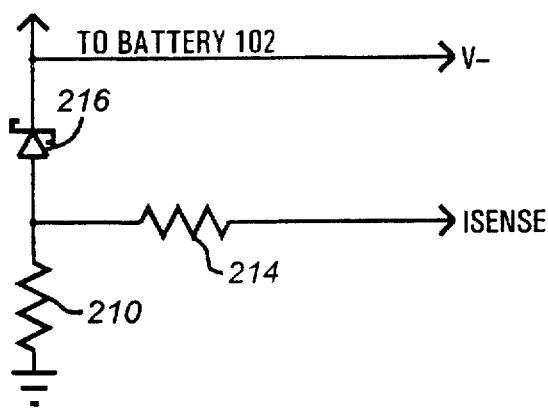
FIG. 5 is a diagram of the equivalent circuit present in the current switch of FIG. 2 when a standby discharge current exists in the battery.

Shown in FIG. 5 is an equivalent circuit of current switch 104 when battery is providing power to the host computer system which is in the standby mode. Schottky diode 216, with its low on-state voltage, provides a current path through resistor 210 when charge control circuit 106 negates CNTRL. It is to be noted that diode 204 does not conduct because the on-state voltage of Schottky diode 206 combined with the small voltage drop across resistor 210 is smaller than the on-state voltage of diode 204. Diode 216 effectively bypasses any current limiting by resistor 212. Thus, resistor 210 furnishes ISENSE when battery 102 is in a standby discharge current state.

In summary, when power source 100 is present and enabled, charge control circuit 106, through CNTRL, places battery 102 in either a fast charge or a trickle charge state. When CNTRL is negated and battery 102 is in a trickle charge state, resistor 210 furnishes ISENSE. When CNTRL is asserted and battery 102 is in a fast charge state, resistor 208 furnishes ISENSE having the first predetermined gain.

When power source 100 is disabled or not present, charge control circuit 106, through CNTRL, places battery 102 in either a main discharge or a standby discharge state. When CNTRL is negated and battery 102 is in a standby discharge state, resistor 210 furnishes ISENSE. When CNTRL is asserted and battery 102 is in a main discharge state, resistor 208 furnishes ISENSE having the second predetermined gain.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A circuit for measuring the current through an external device, the circuit having a signal input node being configurable in series with the external device and a current sense node for providing a current signal, the circuit comprising:
   a first internal node having a path of first impedance to ground, the first internal node being coupled via a first switch to the signal input node and via a second switch to the current sense node, the switches having a first state for selectively coupling both the signal input node and the current sense node to the path of first impedance to ground and a second state for selectively decoupling the first internal node from both the signal input node and the current sense node;
   a second internal node being coupled via a second impedance to ground, via a third impedance to the current sense node, and via a fourth impedance to the signal input node; and
   a charge control circuit at the current sense node responsive to the voltage at the current sense node and to the state of the switches, the charge control circuit determining the current through the external device.

2. The circuit of claim 1, wherein the external device is a battery, the signal input node being one of the terminals of the battery.

3. The circuit of claim 2, wherein the battery is coupled to a computer system capable of discharging the battery, the computer system being fully powered when the switches are in the first state, such that high currents and main currents from the battery are directed through the path of first impedance to ground.

4. The circuit of claim 2, wherein the battery is coupled to a computer system if capable of discharging the battery, the computer system being in a standby-mode when the switches are in the second state, such that low currents, standby currents, and trickle currents from the battery are directed through the second impedance path to ground.

5. The circuit of claim 1, wherein the each of the switches includes a MOS transistor having a source terminal connected to the first internal node, the MOS transistor of the first switch having a drain terminal connected to the signal input node and the MOS transistor of the second switch having a drain terminal connected to the sense indicator node, the gates of the two transistors being coupled to receive a control signal commanding the state of the switches.

6. The circuit of claim 1, further including a pair of diodes having anodes connected to the first internal node, the cathode of the first diode being coupled to the signal input node and the cathode of the second diode being coupled to the sense indicator node, the second diode providing a unidirectional path for current from the first internal node to the second internal node and preventing current from the second internal node to the first internal node when the second switch is in the second state.

7. The circuit of claim 1, wherein the first impedance, coupling the first internal node to ground, is of significantly lower impedance than the second impedance, coupling the second internal node to ground, such that when the first switch is in the first state substantially all of the current from the signal input node to ground passes through the first impedance and substantially none of the current from the signal input node to ground passes through the second impedance.

8. The circuit of claim 1, wherein the fourth impedance is significantly greater than the third impedance, such that current from passing through the fourth impedance is substantially prevented when the switches are in the first state by a path through the first switch and the second and third impedances.

9. The circuit of claim 1, wherein second impedance, in series with the parallel combination of the third impedance and the fourth impedance, is significantly greater than the first impedance, such that current from passing through the second, third, and fourth impedances is substantially prevented when the switches are in the first state by a path through the first impedance.

10. The circuit of claim 1, further comprising a diode providing a current path from the second internal node to the signal input node in parallel with the fourth impedance, such that when the switches are in the second state, a low-impedance current path from the second internal node to the signal input node maintains the voltage of the second internal node substantially equal to the voltage of the signal input node.

11. A computer system having a processor, a battery, and a circuit for measuring the current through an external device, the circuit having a signal input node being configurable in series with the external device and a current sense node for providing a current signal, the circuit comprising:
   a first internal node having a path of first impedance to ground, the first internal node being coupled via a first switch to the signal input node and via a second switch to the current sense node, the switches having a first state for selectively coupling both the signal input node and the current sense node to the path of first impedance to ground and a second state for selectively decoupling the first internal node from both the signal input node and the current sense node;
   a second internal node being coupled via a second impedance to ground, via a third impedance to the current sense node, and via a fourth impedance to the signal input node; and
   a charge control circuit at the current sense node responsive to the voltage at the current sense node and to the state of the switches, the charge control circuit determining the current through the external device.

12. The computer system of claim 11, wherein the signal input node is one of the terminals of the battery.

13. The computer system of claim 11, wherein the each of the switches includes a MOS transistor having a source terminal connected to the first internal node, the MOS transistor of the first switch having a drain terminal connected to the signal input node and the MOS transistor of the second switch having a drain terminal connected to the sense indicator node, the gates of the two transistors being coupled to receive a control signal commanding the state of the switches.

14. The computer system of claim 11, further including a pair of diodes having anodes connected to the first internal node, the cathode of the first diode being coupled to the signal input node and the cathode of the second diode being coupled to the sense indicator node, the second diode providing a unidirectional path for current from the first internal node to the second internal node and preventing current from the second internal node to the first internal node when the second switch is in the second state.

15. The computer system of claim 11, wherein the first impedance, coupling the first internal node to ground, is of significantly lower impedance than the second impedance, coupling the second internal node to ground, such that when the first switch is in the first state substantially all of the current from the signal input node to ground passes through the first impedance and substantially none of the current from the signal input node to ground passes through the second impedance.

16. The computer system of claim 11, wherein the fourth impedance is significantly greater than the third impedance, such that current from passing through the fourth impedance is substantially prevented when the switches are in the first state by a path through the first switch and the second and third impedances.

17. The computer system of claim 11, wherein second impedance, in series with the parallel combination of the third impedance and the fourth impedance, is significantly greater than the first impedance, such that current from passing through the second, third, and fourth impedances is substantially prevented when the switches are in the first state by a path through the first impedance.

18. The computer system of claim 12, wherein the battery is coupled to a computer system capable of discharging the battery, the computer system being fully powered when the switches are in the first state, such that high currents and main currents from the battery are directed through the path of first impedance to ground.

19. The computer system of claim 12, wherein the battery is coupled to a computer system capable of discharging the battery, the computer system being in a standby-mode when the switches are in the second state, such that low currents, standby currents, and trickle currents from the battery are directed through the second impedance path to ground.

20. The computer system of claim 11, further comprising a diode providing a current path from the second internal node to the signal input node in parallel with the fourth impedance, such that when the switches are in the second state, a low-impedance current path from the second internal node to the signal input node maintains the voltage of the second internal node substantially equal to the voltage of the signal input node.

21. In a computer system having a processor and a battery, the processor capable of discharging the battery in at least two states, a method for measuring the current through the battery, the method comprising the steps of:

coupling at least one terminal of the battery to a signal input node of a circuit;

determining the state of the discharge;

based upon the state of the discharge, selecting an impedance between the signal input node of the circuit and ground potential, at least one impedance being implemented as a series of multiple impedances;

switching the circuit to the selected impedance;

directing a current generated by the discharge of the battery through the circuit, the current passing through the selected impedance;

determining the voltage at a terminal of an impedance through which the current passes;

determining the current based on the determined voltage.

22. The method of claim 21, wherein the step of selecting an impedance includes a step selected from a group consisting of opening a switch and closing a switch.

23. The method of claim 21, wherein the step of selecting an impedance includes a step of asserting or negating a signal to a gate terminal of a metal oxide semiconductor field effect transistor within the switch.

* * * * *